(12) United States Patent
Leleu

(10) Patent No.: US 11,873,808 B2
(45) Date of Patent: Jan. 16, 2024

(54) METHOD FOR CONTROLLING THE START-UP OF AN OIL PUMP

(71) Applicant: RENAULT s.a.s., Boulogne-Billancourt (FR)

(72) Inventor: Mathieu Leleu, Fourqueux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 178 days.

(21) Appl. No.: 17/432,309

(22) PCT Filed: Jan. 28, 2020

(86) PCT No.: PCT/EP2020/051980
§ 371 (c)(1),
(2) Date: Aug. 19, 2021

(87) PCT Pub. No.: WO2020/169308
PCT Pub. Date: Aug. 27, 2020

(65) Prior Publication Data
US 2022/0170455 A1 Jun. 2, 2022

(30) Foreign Application Priority Data
Feb. 21, 2019 (FR) ..................... 19 01738

(51) Int. Cl.
*F04B 49/02* (2006.01)
*F04B 17/03* (2006.01)
(Continued)

(52) U.S. Cl.
CPC .............. *F04B 49/02* (2013.01); *F04B 17/03* (2013.01); *F04B 49/20* (2013.01);
(Continued)

(58) Field of Classification Search
CPC .......... F04B 49/02; F04B 49/20; F04B 17/03; F04B 2203/0201; F04B 2203/0209;
(Continued)

(56) References Cited

U.S. PATENT DOCUMENTS 8,814,534 B2    8/2014  Ikeda
8,827,656 B2 *  9/2014  Sano ...................... F16H 61/30
                                                        417/45
(Continued)

FOREIGN PATENT DOCUMENTS

WO    WO 2018/016276 A1    1/2018

OTHER PUBLICATIONS

International Search Report dated Mar. 9, 2020 in PCT/EP2020/051980 filed Jan. 28, 2020, 2 pages.
(Continued)

*Primary Examiner* — Christopher S Bobish
(74) *Attorney, Agent, or Firm* — Oblon, McClelland, Maier & Neustadt, L.L.P.

(57) ABSTRACT

A method controls the start-up of an oil pump of a gearbox by a brushless electric motor that has no position sensor. The stator coils are powered from the off mode in a constant-current open-loop control sequence until the pump reaches a speed threshold at which speed regulation switches over to closed-loop control on a setpoint corresponding to the lubrication flow rate required to ensure the reliability of the gearbox, but without in so doing exceeding a current threshold indicative of pump seizure, at which point motor control switches back over to the constant-current open-loop control sequence. The open-loop current setpoint is higher than the threshold for switching over to closed-loop control so that in the open-loop control mode the motor torque available at the pump is higher than in the closed-loop control mode.

4 Claims, 3 Drawing Sheets

(51) Int. Cl.
*F04B 49/20* (2006.01)
*F16H 57/04* (2010.01)

(52) U.S. Cl.
CPC .. *F16H 57/0447* (2013.01); *F04B 2201/1201* (2013.01); *F04B 2201/1202* (2013.01); *F04B 2203/0201* (2013.01); *F04B 2203/0209* (2013.01); *F04B 2205/09* (2013.01)

(58) Field of Classification Search
CPC ...... F04B 2201/1201; F04B 2201/1202; F16H 57/0447
See application file for complete search history.

(56) References Cited

U.S. PATENT DOCUMENTS

| | | | |
|---|---|---|---|
| 9,194,894 B2* | 11/2015 | Jayanth | F04B 39/121 |
| 9,559,623 B2* | 1/2017 | Mullin | H02P 6/181 |
| 9,618,154 B2 | 4/2017 | Uusitalo et al. | |
| 9,976,549 B2* | 5/2018 | Mueller | H02P 6/10 |
| 10,263,547 B2* | 4/2019 | Ifrim | H02P 1/46 |
| 10,737,753 B1* | 8/2020 | Gonring | B63J 99/00 |
| 11,421,675 B2* | 8/2022 | Kanchana | F04B 17/03 |
| 2006/0120876 A1* | 6/2006 | Kitano | F16H 61/0031 417/42 |
| 2012/0063920 A1 | 3/2012 | Ikeda | |
| 2013/0075198 A1 | 3/2013 | Uusitalo et al. | |
| 2019/0234398 A1* | 8/2019 | Endo | F04B 49/20 |
| 2019/0316578 A1* | 10/2019 | Araki | F04B 17/03 |

OTHER PUBLICATIONS

Preliminary French Search Report dated Sep. 5, 2019 in French Patent Application No. 1901738 filed Feb. 21,2019, 3 pages (with Translation of Category).

* cited by examiner

METHOD FOR CONTROLLING THE START-UP OF AN OIL PUMP

BACKGROUND

The present invention relates to the control of the start-up of oil pumps, notably oil pumps with a motor without brushes, or "brushless", and without position measurement sensor, or "sensorless".

More specifically, the subject of the invention is a method for controlling the start-up of a gearbox oil pump by a brushless and position-sensorless electric motor, in which the stator coils are powered from off mode, according to a constant-current open-loop control sequence until the pump reaches a speed threshold at which the computer switches over to closed-loop control on a speed setpoint corresponding to the lubrication flow rate necessary to ensure the reliability of the gearbox, but without exceeding a diagnostic threshold, which detects the seizure of the pump, and at which the motor control switches back over to the constant-current open-loop control sequence.

The lubrification of gearboxes can be performed either by the spraying of oil into the gearbox and by gravity sprinkling of the elements to be lubricated, or using an oil-circulating pump, more often than not electric. The start-up of the pump is required in all conditions of use, notably at low temperature. In a pump, a brushless motor offers a number of advantages over the motor with brushes, notably by its higher torque/bulk ratio, its better dynamic range, and its lower operating noise.

Moreover, the reliability of the brushless motor is greater than that of the motor with brushes, owing to the replacement of the metal commutator by an electronic switch. The latter nevertheless requires a sequenced powering of the stator coils, which requires the position of the rotor with respect to the stator to be known. For that, it is possible to use Hall-effect position sensors, or sensorless solutions, such as measurement of the back-electromotive force of the non-active windings, called "back EMF" voltage. Given the polluted environment, and the high objectives of reliability and of cost control, the sensorless solution is preferable. However, since the back-EMF voltage is proportional to the speed of rotation of the rotor, the measured voltage is zero when the rotor is stopped. Furthermore, the phase detection is sensitive to temperature. Finally, the back-EMF signal is accompanied by "noises" at low speed. In these conditions, a minimum amplitude is necessary to detect the form of the signal. In practical terms, it is considered that the measurement of the back-EMF signal can be used only if the speed of the rotor is above 500 rpm.

To start up the brushless motor of the pump, from zero to 500 rpm, the coils can be powered according to a predetermined sequence (algorithm) at constant current, in open-loop (BO). Beyond a speed threshold, for example of 500 rpm, the controller of the pump can switch over to a closed-loop (BF) control mode, in which the phase current is regulated by a PID (Proportional Integral Derivative) type regulator on a rotation speed setpoint corresponding to the lubrication flow rate necessary to ensure the reliability of the gearbox.

The oil pump generally has a phase current monitoring system, to detect the possible seizure thereof, and to diagnose the condition thereof. If the rotor seizes (broken, metal particle in the pump mechanism), the PID regulator can detect the speed loop difference. It then increases the current, to increase the torque of the pump motor, and to attempt to speed it up. If this current exceeds a threshold, the pump sends a message to the controller of the power train, to alert it of a failure.

The gearbox oil temperature range varies in principle from −40° C. to 150° C. The viscosity of the oil varies very significantly within this range. The resisting torque on the pump is proportional to the viscosity of the oil, therefore to its temperature. In practice, the range of variation of the temperature and of the resisting torque at the rotor is such that a single calibration of the PID parameters is not feasible to ensure, in all circumstances, a switch from open-loop to closed-loop without exceeding the diagnostic current threshold. Thus, if the PID current regulator is calibrated to ensure a good hot start-up, this same PID regulator will cause the cold current threshold to be exceeded and vice versa.

For the pump to function satisfactorily, the parameters of the current regulator must be able to be adapted to the temperature conditions. A first solution for resolving this problem is to insert an oil temperature sensor into the lubrication circuit. This sensor is linked, either to the GMP (power train) computer, or to the pump computer, so as to be able to adjust the parameters of the PID current regulator as a function of the temperature.

The publication U.S. Pat. No. 8,814,534 describes a transmission oil pump controlled by an electric motor, comprising an oil temperature sensor, and a controller regulating the current of the electric motor and the torque supplied by the pump as a function of the temperature. When it detects a temperature deviation between the temperature indicated by the temperature sensor and the temperature prevailing in proximity to the pump, the controller is configured to lower, on start-up, the rotation speed of the motor. It lowers this speed with respect to the setpoint on which the motor should deliver the torque corresponding to the oil temperature detected by the sensor.

BRIEF SUMMARY

The present invention aims to adapt the operating parameters of a lubrication pump motor current regulator as a function of the viscosity of the oil, without using an oil temperature sensor.

To this end, the open-loop current setpoint is above the threshold for switchover to closed-loop mode, so as to have, in open-loop mode, a motor torque on the pump that is higher than in closed-loop mode.

BRIEF DESCRIPTION OF THE DRAWINGS

The present invention will be better understood on reading the following description of a nonlimiting embodiment thereof, with reference to the attached drawings, in which.

DETAILED DESCRIPTION

Figure 1:
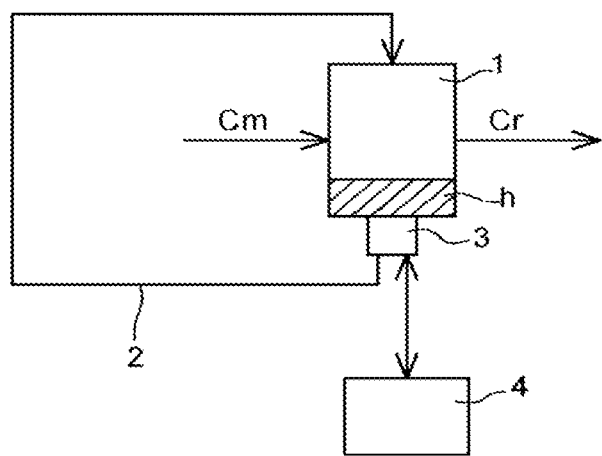
FIG. 1 is a simplified control diagram.

In FIG. 1, a gearbox 1 is schematically represented transmitting the torque $C_m$ from a motor to the wheels (torque at the wheels $C_r$), on different transmission ratios. The oil pump 3, placed under the bottom of the box enclosing the lubrication oil h, supplies an external lubrication circuit 2, by which the oil is reintroduced into the upper part of the box, to ensure the lubrication of the parts. In this example, the pump has a brushless and temperature-sensorless motor (not represented), communicating with the controller of the power train 4.

Figure 2:
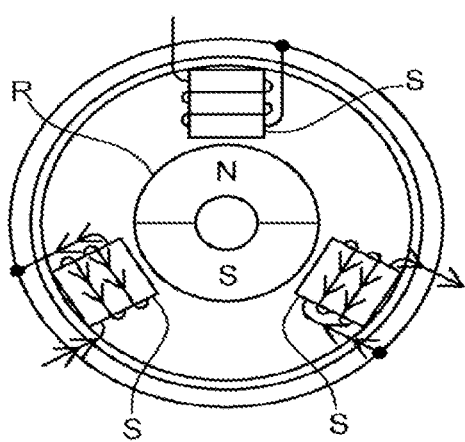
FIG. 2 illustrates the brushless motor.

FIG. 2 shows a diagram of a motor with three wound stators S, the windings of which are connected to an electronic switch (not represented). When two of the three stators are powered electrically, the rotor creates, in the third, a back-electromotive force, or back-EMF. A brushless and current-sensorless motor is controlled by a current regulator, usually of PID type.

In a gearbox lubrication pump, it is known practice to calibrate the current for an efficient start-up, for example from a gearbox oil temperature of 20° C. The control is provided either in open-loop (BO) mode according to determined constant-current sequences, or in closed-loop (BF) mode on current setpoints that are variable as a function of the speed, reached by the motor and by the pump. To start up the pump cold, the usual method is to power the rotor coils according to a first determined constant-current sequence, which starts from the off mode of the motor and of the pump (zero speed) to a pre-established speed threshold of the motor. From this threshold, the motor switches over to a second control mode, in closed-loop mode, on a pump speed setpoint. This setpoint corresponds to the lubrication flow rate necessary to ensure the reliability of the gearbox.

When controlling the start-up of a gearbox oil pump by a brushless and position-sensorless electric motor, it is advantageously powered, from off, according to an open-loop mode computer control sequence. In this first sequence, the control is performed at constant current, until the pump reaches a speed threshold. The regulation then switches over to a closed-loop control, on a speed setpoint corresponding to the lubrication flow rate necessary to ensure the reliability of the gearbox. However, in closed-loop mode, the current cannot exceed a diagnostic threshold, by which the seizure of the pump is detected. If this threshold is reached, the computer requires the control of the motor to switch back over to the constant-current open-loop control sequence.

The lubrication flow rate is a current regulator setting parameter, which must be adjusted as a function of the degree of viscosity of the oil, and therefore of its temperature. The issue on which the invention is based is to adjust the parameterization of the current regulator, to the oil temperature, without having any oil temperature sensor. As indicated above, the motor has a phase current monitoring system. This system monitors the passing of the current through a diagnostic threshold that makes it possible to detect that the pump is seized. In the proposed solution, it is chosen to calibrate the phase current in open-loop mode on a value above the phase current diagnostic threshold in closed-loop mode, so as to have a motor torque on the pump which is higher in open-loop mode than in closed-loop mode.

When the speed of the vehicle is positive, the computer of the power train (GMP) first sends a speed setpoint to the pump, which is above the switchover threshold between the open-loop mode and the closed-loop mode. The computer of the GMP (or the computer of the oil pump, depending on the chosen software) uses the diagnostic current threshold overshoot information to detect that the rotor is seized in closed-loop phase. The computer counts the number of seizures. When the counter exceeds a threshold n of number of seizures, it engages a phase of oscillation of the rotor (sinusoidal) called "deblocking". This phase makes it possible to remove any possible metal particle jammed in the mechanism of the pump.

In the absence of metal particles in the oil, it is considered that the seizure of the rotor is due to the viscosity of the oil, which is too great at low temperature. The method proposed for adapting the parameters of the regulator to the temperature of the oil relies on the detection of a seizure. This event is exploited to send to the regulator a speed setpoint, such that the pump operates in open-loop mode for a calibrated period.

According to the invention, the open-loop current calibration is above the closed-loop current diagnostic threshold, so as to have, in open-loop mode, a motor torque on the pump that is higher than in closed-loop mode. The pump can thus operate at a lower speed in open-loop mode than in closed-loop mode but thus ensure a minimum lubrication of the gearbox, at low temperature. While the gearbox operates at low temperature, the shearing of the oil by the pinions (splash lubrication) and the motive power dissipated in the gearbox raises the temperature of the oil. Each time a seizure of the pump is detected in closed-loop mode, the computer of the GMP switches over the pump to open-loop mode for a calibrated period. After this calibrated time delay, the computer returns the initial closed-loop mode speed setpoint.

If the temperature of the oil has increased sufficiently for this setpoint to remain under the seizure detection threshold in closed-loop mode, the pump can then reach its speed setpoint. The pump is effectively started up.

Otherwise, the oil temperature is still too low. The resisting torque on the rotor is greater than the torque that the motor is capable of supplying in closed-loop mode. At the end of the calibrated time delay, the computer of the GMP once again controls the speed in closed-loop mode. The computer of the pump then seeks to increase the current, and exceeds the current diagnostic threshold without reaching its speed setpoint. The computer of the GMP returns the open-loop mode control setpoint each time the seizure detection threshold is exceeded in closed-loop mode. This alternation of open-loop and closed-loop control periods continues until the temperature of the oil increases sufficiently to allow the oil pump to start up in closed-loop mode.

Figure 3:
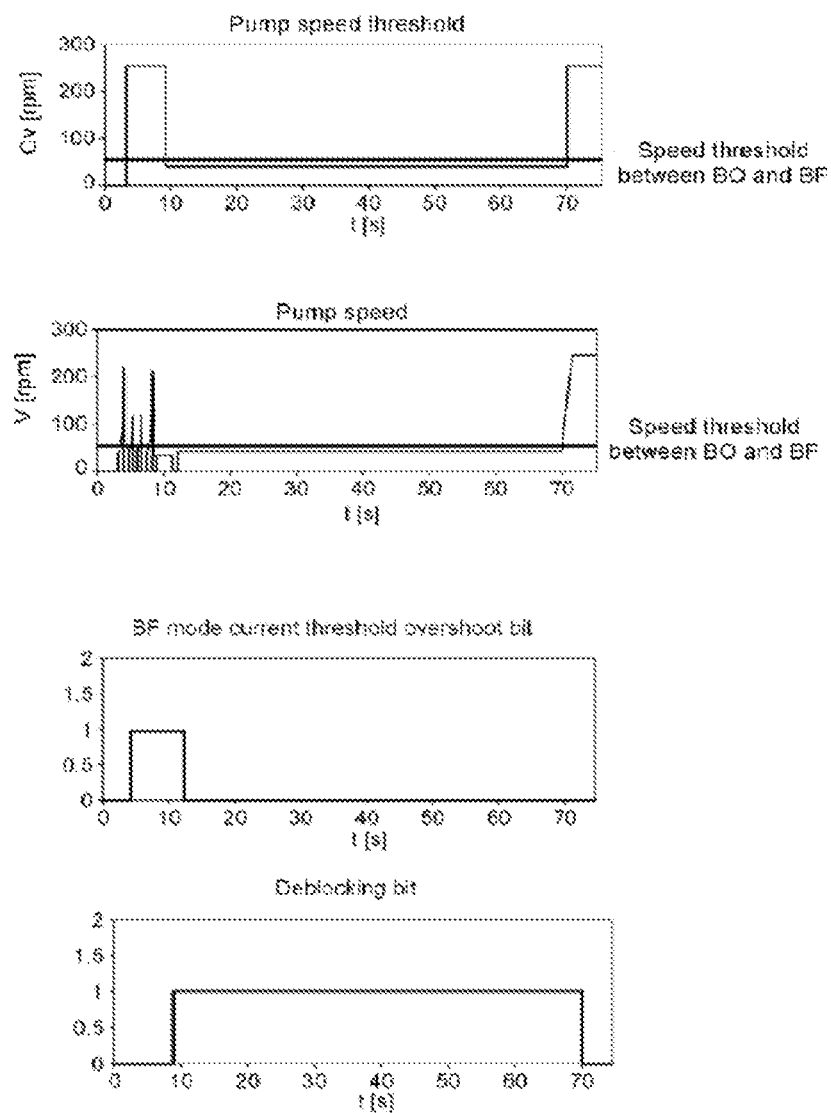
FIG. 3 reproduces the typical profile of the signals analyzed.

FIG. 3 shows, overlaid, the trend over time of several signals:
  the speed setpoint $C_v$ of the pump in revolutions per minute, on two levels with respect to the threshold for switchover from open-loop mode to closed-loop mode BO/BF,
  the speed of the pump V in revolutions per minute during the open-loop and closed-loop control phases, up to effective start-up,
  the phase current overshoot (seizure detection) signals (bits),
  the signal applying oscillation (deblocking bit) of the rotor.

Figure 4:
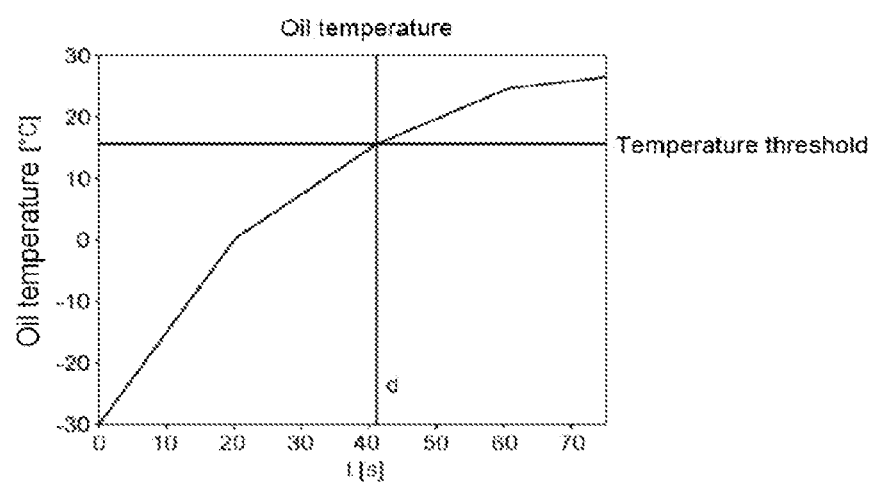
FIG. 4 shows the trend of the oil temperature.

FIG. 4 shows the trend of the temperature θ of the oil in degrees with respect to the threshold s from which the pump can operate with a current in closed-loop mode that is lower than the seizure diagnostic current threshold (oil sufficiently hot). To sum up, the control consists in testing the viscosity of the oil and its temperature through the resisting torque at the rotor of the pump, because this torque is the image of the phase current. The value of the current is used as an estimator of the temperature of the oil. Owing to this estimation, it is not necessary to know the temperature of the oil to allow the pump to start up. By operating on the basis of tests and detection of seizures, it becomes possible to ensure an autonomous start-up of the pump, regardless of the oil temperature.

The elimination of the temperature sensor offers many advantages:
- reduction of costs,
- increased reliability,
- simpler development, with no mapping table between the oil temperature and the PID regulator parameters,
- elimination of an input on the GMP computer or on the oil pump,
- simplified architecture of the gearbox and of its coverless environment.

This last advantage is very beneficial, notably on a hybrid power train, where the installation of the temperature sensor on the casing, and the run of its electrical cable are problematical, because of the bulk of the sector concerned.

The invention claimed is:

1. A method for controlling the start-up of a gearbox oil pump by a brushless electric motor, without position sensor, comprising:
   powering stator coils of the motor from an off mode according to a constant-current open-loop control sequence until the pump reaches a speed threshold at which a speed regulation switches over to closed-loop control on a setpoint corresponding to a lubrication flow rate necessary to ensure reliability of a gearbox, but without exceeding a current threshold detecting seizure of the pump at which motor control switches back over to a constant-current open-loop control sequence,
   wherein the open-loop current setpoint is higher than the threshold for switching over to closed-loop mode, so as to have, in open-loop mode, a motor torque on the pump that is higher than in the closed-loop mode, and
   wherein, upon detection of seizure of the pump in the closed-loop mode, a GMP computer switches over the pump speed regulation to the open-loop mode for a calibrated period.

2. The method for controlling the start-up of an oil pump as claimed in claim 1, wherein the open-loop mode pump control sequence comprises a sequence of oscillations of a rotor of the motor.

3. The method for controlling the start-up of an oil pump as claimed in claim 1, wherein, at the end of the calibrated period, the GMP computer sends a speed setpoint to the pump corresponding to operation of the closed-loop mode.

4. The method for controlling the start-up of an oil pump as claimed in claim 3, wherein the GMP computer returns the open-loop control sequence each time the seizure detection threshold is exceeded in the closed-loop mode.

* * * * *